(12) United States Patent
Wang et al.

(10) Patent No.: US 11,991,704 B2
(45) Date of Patent: May 21, 2024

(54) UPLINK RELAY FOR WIRELESS POWERED INTERNET OF THINGS (IoT)

(71) Applicant: QUALCOMM Incorporated, San Diego, CA (US)

(72) Inventors: Xiaojie Wang, Hillsborough, NJ (US); Junyi Li, Fairless Hills, PA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 17/644,300

(22) Filed: Dec. 14, 2021

(65) Prior Publication Data
US 2023/0189269 A1      Jun. 15, 2023

(51) Int. Cl.
*H04W 72/21* (2023.01)
*H04W 52/02* (2009.01)
*H04W 72/12* (2023.01)
*H02J 50/00* (2016.01)

(52) U.S. Cl.
CPC ....... *H04W 72/21* (2023.01); *H04W 52/0229* (2013.01); *H04W 72/12* (2013.01); *H02J 50/001* (2020.01)

(58) Field of Classification Search
CPC .............................. H04W 72/12; H04W 72/21
USPC ........................................................ 370/329
See application file for complete search history.

(56) References Cited

U.S. PATENT DOCUMENTS

2020/0351889 A1   11/2020   Bai et al.
2020/0383149 A1   12/2020   Rico Alvarino et al.

FOREIGN PATENT DOCUMENTS

CN          111385010 A        7/2020

OTHER PUBLICATIONS

International Search Report and Written Opinion—PCT/US2022/078982—ISA/EPO—Mar. 2, 2023.

*Primary Examiner* — Angel T Brockman
(74) *Attorney, Agent, or Firm* — Norton Rose Fulbright US LLP

(57) ABSTRACT

Systems, methods, and devices for wireless communication that support mechanisms for configuring an uplink relay for wireless powered IoT operations in a wireless communication system. A base station transmits a power signal to wireless powered IoT devices. The wireless powered IoT devices harvest energy from the power signal to power their reception/transmission circuitry. The base station transmits an information signal to trigger the wireless powered IoT devices to reflect a backscatter transmission. The wireless powered IoT devices transmit a backscatter transmission in response to receiving the information signal from the base station. The base station transmits configurations to a UE including configuration information respectively corresponding to the wireless powered IoT devices, and include information that the UE may use to detect the backscatter transmissions from the wireless powered IoT devices and relay them to the base station based on the configurations.

30 Claims, 9 Drawing Sheets

UPLINK RELAY FOR WIRELESS POWERED INTERNET OF THINGS (IoT)

TECHNICAL FIELD

Aspects of the present disclosure relate generally to wireless communication systems, and more particularly, to configuring an uplink relay for wireless powered internet of things (IoT) operations.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes receiving, from a base station, configuration information for one or more wireless powered internet of things (IoT) devices, the configuration information for the one or more wireless powered IoT devices including information for decoding detected transmissions from the one or more wireless powered IoT devices, receiving, from the base station, a scheduling message scheduling the UE to relay at least one transmission from the one or more wireless powered IoT devices to the base station, detecting the at least one transmission from the one or more wireless powered IoT devices based on the configuration information for the one or more wireless powered IoT devices, and relaying, based on the scheduling message, the at least one transmission to the base station.

In an additional aspect of the disclosure, a method of wireless communication performed by a base station includes transmitting, to a UE, configuration information for one or more IoT devices, the configuration information for the one or more IoT devices including information for decoding transmissions from the one or more IoT devices, transmitting, to the one or more IoT devices, a power signal configured to provide energy for the one or more IoT devices to power communication circuitry, transmitting, to the one or more IoT devices, an information signal configured to trigger the one or more IoT devices to transmit the transmissions, transmitting, to the UE, a scheduling message scheduling the UE to relay at least one transmission of the transmissions from the one or more IoT devices to the base station, and receiving, based on the scheduling message, the at least one transmission from the UE.

In an additional aspect of the disclosure, a method of wireless communication performed by an apparatus configured for IoT operations includes receiving, from a base station, a power signal configured to provide energy for the apparatus to power the communication circuitry, powering up the communication circuitry in response to receiving the power signal, receiving, from the base station, an information signal configured to trigger the apparatus to transmit at least one transmission, and transmitting the at least one transmission to a UE configured to relay the at least one transmission to the base station.

In an additional aspect of the disclosure, a UE includes at least one processor and a memory coupled to the at least one processor. The at least one processor stores processor-readable code that, when executed by the at least one processor, is configured to perform operations including receiving, from a base station, configuration information for one or more wireless powered IoT devices, the configuration information for the one or more wireless powered IoT devices including information for decoding detected transmissions from the one or more wireless powered IoT devices, receiving, from the base station, a scheduling message scheduling the UE to relay at least one transmission from the one or more wireless powered IoT devices to the base station, detecting the at least one transmission from the one or more wireless powered IoT devices based on the configuration information for the one or more wireless powered IoT devices, and relaying, based on the scheduling message, the at least one transmission to the base station.

In an additional aspect of the disclosure, a base station includes at least one processor and a memory coupled to the at least one processor. The at least one processor stores processor-readable code that, when executed by the at least one processor, is configured to perform operations including transmitting, to a UE, configuration information for one or more IoT devices, the configuration information for the one or more IoT devices including information for decoding transmissions from the one or more IoT devices, transmitting, to the one or more IoT devices, a power signal configured to provide energy for the one or more IoT devices to power communication circuitry, transmitting, to the one or more IoT devices, an information signal configured to trigger the one or more IoT devices to transmit the transmissions, transmitting, to the UE, a scheduling message scheduling the UE to relay at least one transmission of the transmissions from the one or more IoT devices to the base station, and receiving, based on the scheduling message, the at least one transmission from the UE.

In an additional aspect of the disclosure, an apparatus configured for IoT operations includes communication circuitry including at least one receiver and at least one transmitter. The apparatus is configured to perform operations including receiving, by the at least one receiver from a base station, a power signal configured to provide energy for the apparatus to power communication circuitry, powering up the communication circuitry in response to receiving the power signal, receiving, by the at least one receiver from the base station, an information signal configured to trigger the apparatus to transmit at least one transmission, and transmitting, by the at least one transmitter, the at least one transmission to a UE configured to relay the at least one transmission to the base station.

In an additional aspect of the disclosure, a non-transitory computer-readable medium stores instructions that, when executed by a processor, cause the processor to perform operations. The operations include receiving, from a base station, configuration information for one or more wireless powered IoT devices, the configuration information for the one or more wireless powered IoT devices including information for decoding detected transmissions from the one or more wireless powered IoT devices, receiving, from the base station, a scheduling message scheduling the UE to relay at least one transmission from the one or more wireless powered IoT devices to the base station, detecting the at least one transmission from the one or more wireless powered IoT devices based on the configuration information for the one or more wireless powered IoT devices, and relaying, based on the scheduling message, the at least one transmission to the base station.

In an additional aspect of the disclosure, a non-transitory computer-readable medium stores instructions that, when executed by a processor, cause the processor to perform operations. The operations include transmitting, to a UE, configuration information for one or more IoT devices, the configuration information for the one or more IoT devices including information for decoding transmissions from the one or more IoT devices, transmitting, to the one or more IoT devices, a power signal configured to provide energy for the one or more IoT devices to power communication circuitry, transmitting, to the one or more IoT devices, an information signal configured to trigger the one or more IoT devices to transmit the transmissions, transmitting, to the UE, a scheduling message scheduling the UE to relay at least one transmission of the transmissions from the one or more IoT devices to the base station, and receiving, based on the scheduling message, the at least one transmission from the UE.

In an additional aspect of the disclosure, a non-transitory computer-readable medium stores instructions that, when executed by a processor, cause the processor to perform operations. The operations include receiving, from a base station, a power signal configured to provide energy for the apparatus to power the communication circuitry, powering up the communication circuitry in response to receiving the power signal, receiving, from the base station, an information signal configured to trigger the apparatus to transmit at least one transmission, and transmitting the at least one transmission to a UE configured to relay the at least one transmission to the base station.

In an additional aspect of the disclosure, an apparatus includes means for receiving, by a UE from a base station, configuration information for one or more wireless powered IoT devices, the configuration information for the one or more wireless powered IoT devices including information for decoding detected transmissions from the one or more wireless powered IoT devices, means for receiving, from the base station, a scheduling message scheduling the UE to relay at least one transmission from the one or more wireless powered IoT devices to the base station, means for detecting the at least one transmission from the one or more wireless powered IoT devices based on the configuration information for the one or more wireless powered IoT devices, and means for relaying, based on the scheduling message, the at least one transmission to the base station.

In an additional aspect of the disclosure, an apparatus includes means for transmitting, by a base station to a UE, configuration information for one or more IoT devices, the configuration information for the one or more IoT devices including information for decoding transmissions from the one or more IoT devices, means for transmitting, to the one or more IoT devices, a power signal configured to provide energy for the one or more IoT devices to power communication circuitry, means for transmitting, to the one or more IoT devices, an information signal configured to trigger the one or more IoT devices to transmit the transmissions, means for transmitting, to the UE, a scheduling message scheduling the UE to relay at least one transmission of the transmissions from the one or more IoT devices to the base station, and means for receiving, based on the scheduling message, the at least one transmission from the UE.

In an additional aspect of the disclosure, an apparatus includes means for receiving, from a base station, a power signal configured to provide energy for the apparatus to power the communication circuitry, means for powering up the communication circuitry in response to receiving the power signal, means for receiving, from the base station, an information signal configured to trigger the apparatus to transmit at least one transmission, and means for transmitting the at least one transmission to a UE configured to relay the at least one transmission to the base station.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
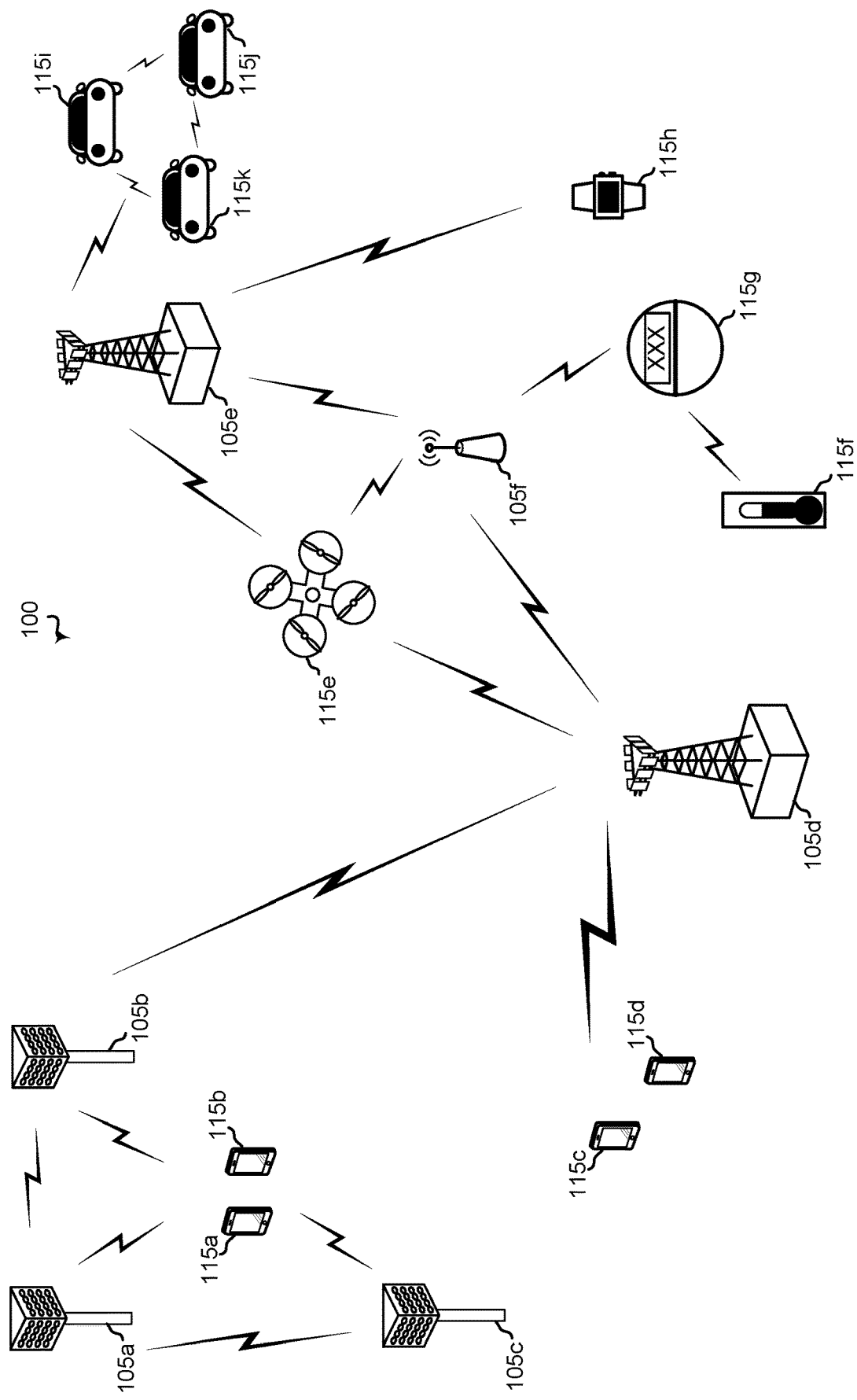
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of sub-carrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.;

and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
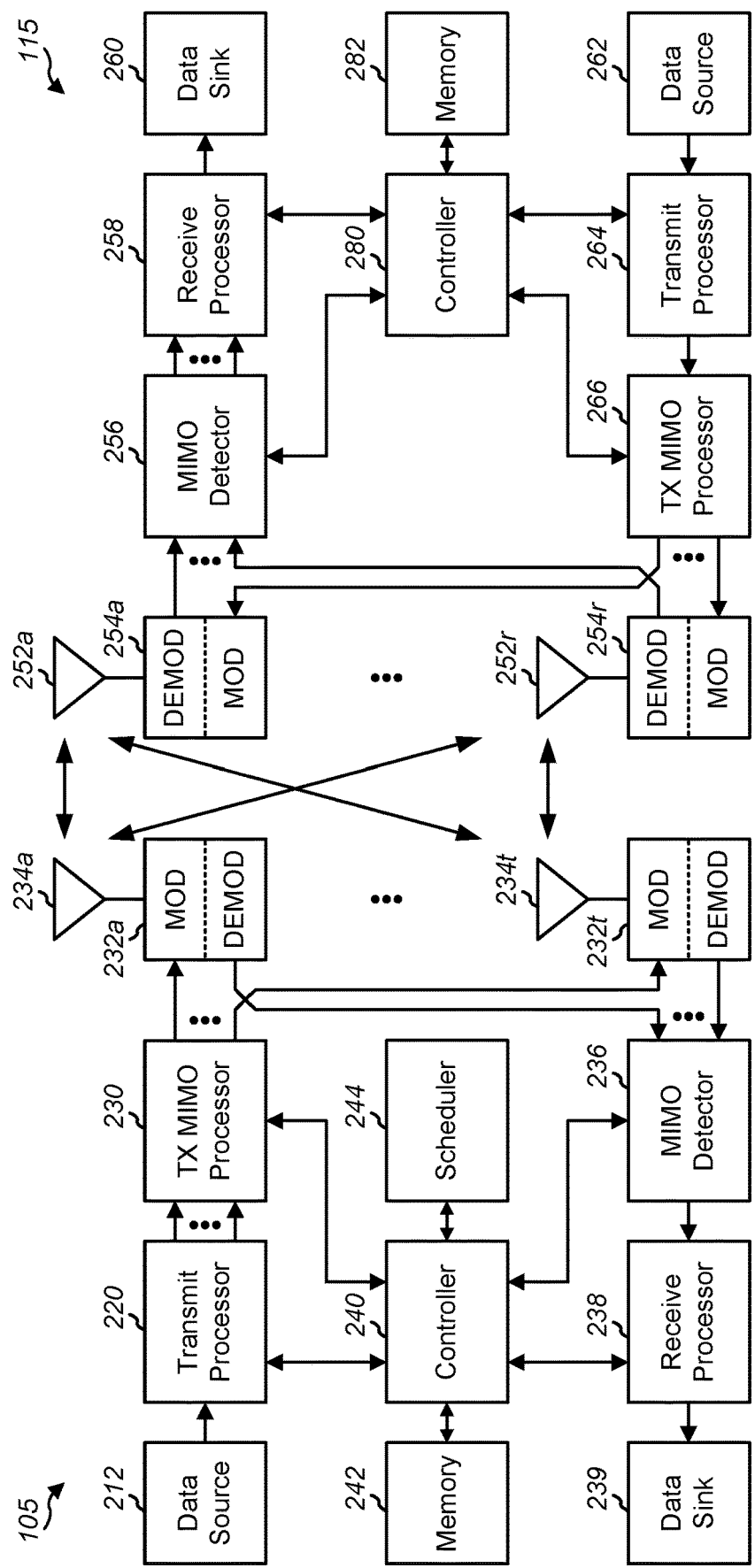
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 5-7, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Current wireless communication systems are expanding and evolving rapidly to take advantage of the benefits of 5G NR. As the deployment and evolution of 5G NR expands to more industrial verticals beyond enhanced mobile broadband (eMBB), e.g., ultra-reliable low-latency communications (URLLC) and massive machine type communications (mMTC), current wireless communication systems may be expanded to support wireless powered internet of things (IoT) implementations. Wireless powered IoT implementations may especially focus on RF identification (RFID) systems, which may offer a host of benefits for passive IoT. In some aspects, a wireless powered IoT device may include IoT devices that harvest energy over the air (e.g., from the energy of signals transmitted by other devices) and may use the harvested energy to power its transmission/reception circuitry in order to perform operations. In aspects, a wireless powered IoT device may include passive IoT devices that may be powered using energy from wireless signals received by the wireless powered IoT device.

RFID systems may offer great economic potential, such as for inventory/asset management inside and outside warehouse, for IoT applications, for sustainable sensor networks in factories and/or agriculture, for smart home applications, etc. RFID may consist of small transponders, also referred to as RFID tags, that may be configured to emit an information-bearing signal in response to receiving a signal (e.g., a signal from an RFID reader or base station). RFID may soon become the most pervasive microchip technology in history.

An RFID tag may be operated without battery. For example, at low-power operations, an RFID tag may be able to harvest energy over the air (e.g., from the energy of signals transmitted by other devices, such as RFID readers) and may use the harvested energy to power its transmission/reception circuitry in order to perform operations. In these implementations, the transmitted signal may be typically backscatter modulated. This low-power operations configurations may enable RFID systems to operate at low energy, low maintenance cost, and may provide a long-life cycle. In some implementations, semi-passive or even active RFID tags may be implemented using a battery, but this may increase the cost of the RFID systems.

As noted above, wireless powered IoT implementations may leverage RFID technology in order to configure IoT sensors that enjoy the benefits of RFID technology. Currently, 3GPP specifications are being developed to support MTC and/or narrowband (NB) IoT implementations, and/or reduced capabilities (RedCap) implementations for MTC applications. However, current implementations of 5G NR lacks mechanisms to efficiently support the most pervasive RFID-type of sensors (e.g., wireless powered IoT devices) in many potential use cases, e.g., asset management, logistics, warehousing and manufacturing, etc.

Proposed specifications for implementing and managing wireless powered IoT devices in 5G NR systems may include configuring a base station to be able to read/write information stored on wireless powered IoT devices, enabling base stations to provide energy to power wireless powered IoT devices. In some proposed solutions, a base station may be configure to receive information-bearing signals reflected from IoT devices, and to read the reflected signals received from the wireless powered IoT devices to decode the information transmitted by the IoT devices.

However, currently proposed implementations for managing wireless powered IoT devices in 5G NR systems do not take into account several issues with the current capabilities of wireless powered IoT devices. For example, current IoT devices have limited range. In some implementations of wireless powered IoT devices, the range may be very short (e.g., less than 10 meters). This short range of wireless powered IoT devices may be due to the low or insufficient link budget. The insufficient link budget may be caused by a base station transmit power (e.g., maximum transmit power) being regulated for the operating band (e.g., the effective isotropically radiated power (EIRP) of an RFID reader in an ultra-high frequency (UHF) band may not exceed 36 dBm). The insufficient link budget may also be caused by a weak reflected backscatter signal from wireless powered IoT devices, as wireless powered IoT devices may be power-limited and the reflected signal power strength is approximately inversely proportional to the fourth power of the distance, e.g., $1/d^4$. Still another issue that may cause an insufficient link budget affecting the operating range of wireless powered IoT devices may be interference from other RFID readers, base stations, RFID tags, other communication systems, etc.

Various aspects of the present disclosure are directed to systems and methods that support mechanisms for configuring an uplink relay for wireless powered IoT operations in a wireless communication system. In particular, the various techniques described herein may be used for implementing, operating, and/or managing wireless powered IoT devices in 5G NR systems. In aspects, a base station may transmit a power signal configured to provide energy to power one or more wireless powered IoT devices. The power signal may be a continuous wave transmission, and the one or more wireless powered IoT devices may be configured to harvest energy from the power signal to power their reception/transmission circuitry. The base station may transmit an information signal configured to trigger the one or more wireless powered IoT devices to transmit or reflect a backscatter transmission. As used herein, a backscatter transmission may refer to a transmission from a wireless powered IoT device. The one or more wireless powered IoT devices may transmit a backscatter transmission in response to receiving the information signal from the base station. In aspects, the backscatter transmission may include information transmitted by the wireless powered IoT device in response to receiving the information signal from the base station. In aspects of the present disclosure, the base station may transmit one or more wireless powered IoT configurations to a UE. The one or more wireless powered IoT configuration may include configuration information respectively corresponding to the one or more wireless powered IoT devices, and may include information that the UE may use to decode the backscatter transmission from the one or more wireless powered IoT devices. In some aspects, the base station may configure the UE to relay backscatter transmissions from the one or more wireless powered IoT devices to the base station based on the one or more wireless powered IoT configurations. The UE may detect the backscatter transmission from the one or more wireless powered IoT devices, and may relay the backscatter transmissions to the base station. In aspects, the UE may relay the backscatter transmissions to the base station by transmitting the detected backscatter transmissions to the base station using scheduled PUSCH resources.

Figure 3:
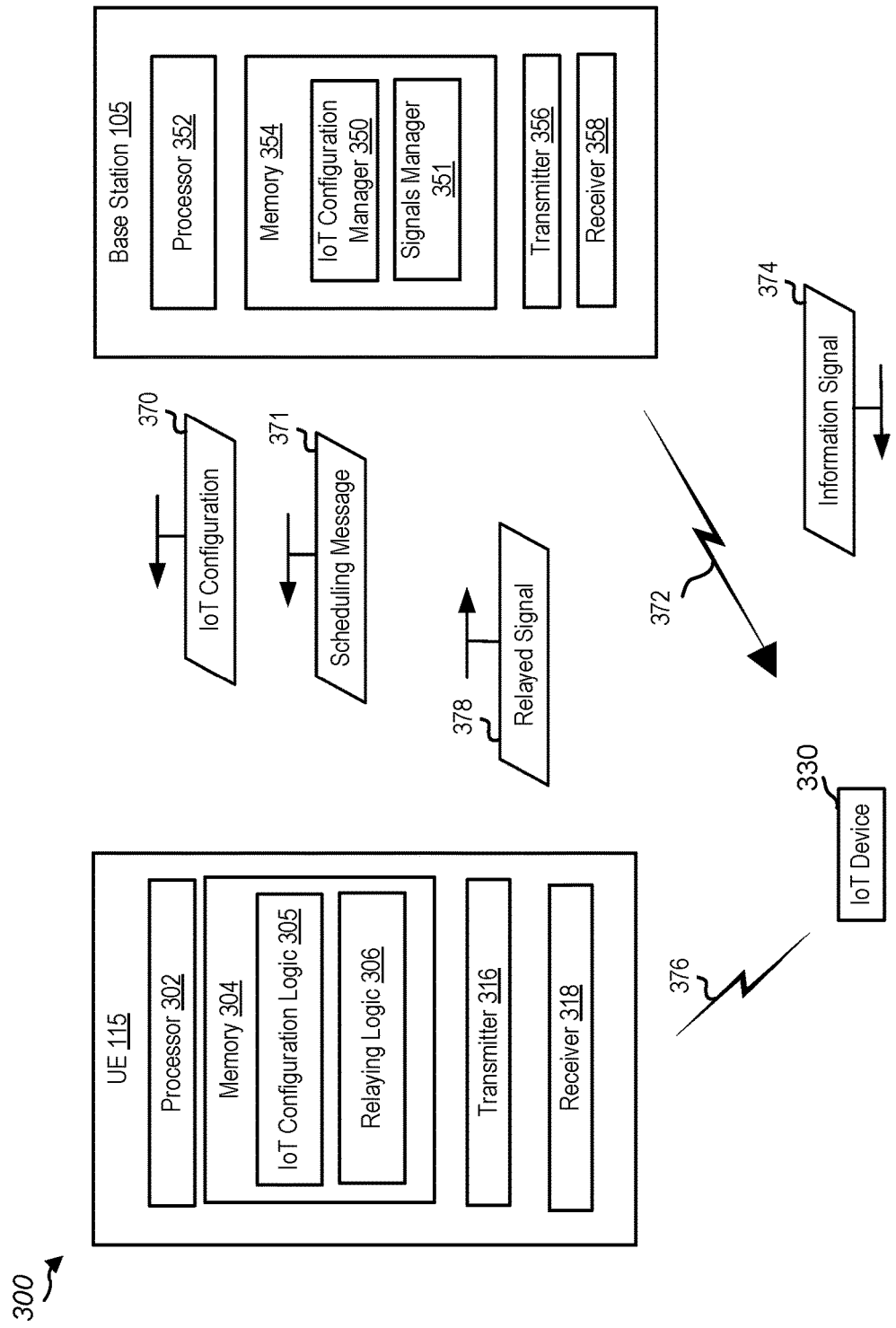
FIG. 3 is a block diagram of an example wireless communications system that supports mechanisms for configuring an uplink relay for wireless powered IoT operations in a wireless communication system according to one or more aspects.

FIG. 3 is a block diagram of an example wireless communications system 300 that supports mechanisms for configuring an uplink relay for wireless powered IoT operations in a wireless communication system according to one or more aspects. In some examples, wireless communications system 300 may implement aspects of wireless network 100. Wireless communications system 300 includes UE 115, wireless powered IoT device 330, and base station 105. Although one UE 115 and one base station 105 are illustrated, in some other implementations, wireless communications system 300 may generally include multiple UEs 115, and may include more than one base station 105. Furthermore, one wireless powered IoT device 330 is illustrated. However, this is merely for illustrative purposes and for ease of explanation, and wireless communications system 300 may include more than one wireless powered IoT device 330. In some aspects, the operations described herein may be applicable where more than one wireless powered IoT device 330 are implemented. In these cases, the one or more wireless powered IoT devices may operate similarly as described in the following discussion.

Wireless powered IoT device 330 may be a typical wireless powered IoT device, such as an RFID IoT device operating in accordance with RFID principles. In aspects, wireless powered IoT device 330 may include reception circuitry configured to receive signals (e.g., from an RFID reader or from base station 105). Wireless powered IoT device 330 may include transmission circuitry, which may include a backscatter transmitter, configured to reflect (e.g., transmit using the backscatter transmitter) a backscatter signal based on the received signals. In aspects, wireless powered IoT device 330 may be configured to harvest energy from transmitted signals (e.g., from a power signal such as power signal 372 transmitted from base station 105). Wireless powered IoT device 330 may use the harvested energy to power the reception and/or the transmission circuitry in order to perform operations in accordance with aspects of the present disclosure. In some aspects, wireless powered IoT device 330 may include a battery that may be recharged using the harvested energy and may provide the power for performing operations.

It is noted that in some aspects, wireless powered IoT device 330 may be an IoT device that includes a semi-passive and/or active implementations. In these aspects, rather than passively reflecting a transmission from base station 105, the IoT device may actively receive the information signal from base station 105 and may transmit a signal to base station 105 (e.g., using UE 115 as a relay). In these aspects, wireless powered IoT device 330 may include mode advance features, such as smart features associated with a smart device. In some aspects, the IoT device may be an smartphone. In these aspects, base station 105 may be aware of the capabilities of wireless powered IoT device 330 (e.g., may know whether wireless powered IoT is a passive device, a semi-passive device, or an active device) and may configure UE 115 accordingly to receive and relay a transmission from wireless powered IoT device 330.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), one or more receivers 318 (hereinafter referred to collectively as "receiver 318"), and one or more antenna modules 306 (hereinafter referred to collectively as "antenna module 306"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store IoT configuration logic 305 and relaying logic 306. In aspects, IoT configuration logic 305 may be configured to perform operations for decoding, based on IoT configuration received from base station 105, backscatter transmissions detected from wireless powered IoT device 330 in accordance with aspects of the present disclosure. In aspects, relaying logic 306 may be configured to perform operations for relaying backscatter transmissions detected from wireless powered IoT device 330 to base station 105 in accordance with aspects of the present disclosure.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to store IoT configuration manager 351 and signals manager 352. In aspects, IoT configuration manager 351 may be configured to perform operations for providing the IoT configuration information of wireless powered IoT device 330 (and other wireless powered IoT devices) to UE 115 for UE 115 to decode backscatter transmission from wireless powered IoT device 330 in accordance with aspects of the present disclosure. In aspects, signals manager 352 may be configured to configure and provide power signals and/or information signals to wireless powered IoT device 330 (and other wireless powered IoT devices) in accordance with aspects of the present disclosure.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

Figure 4:
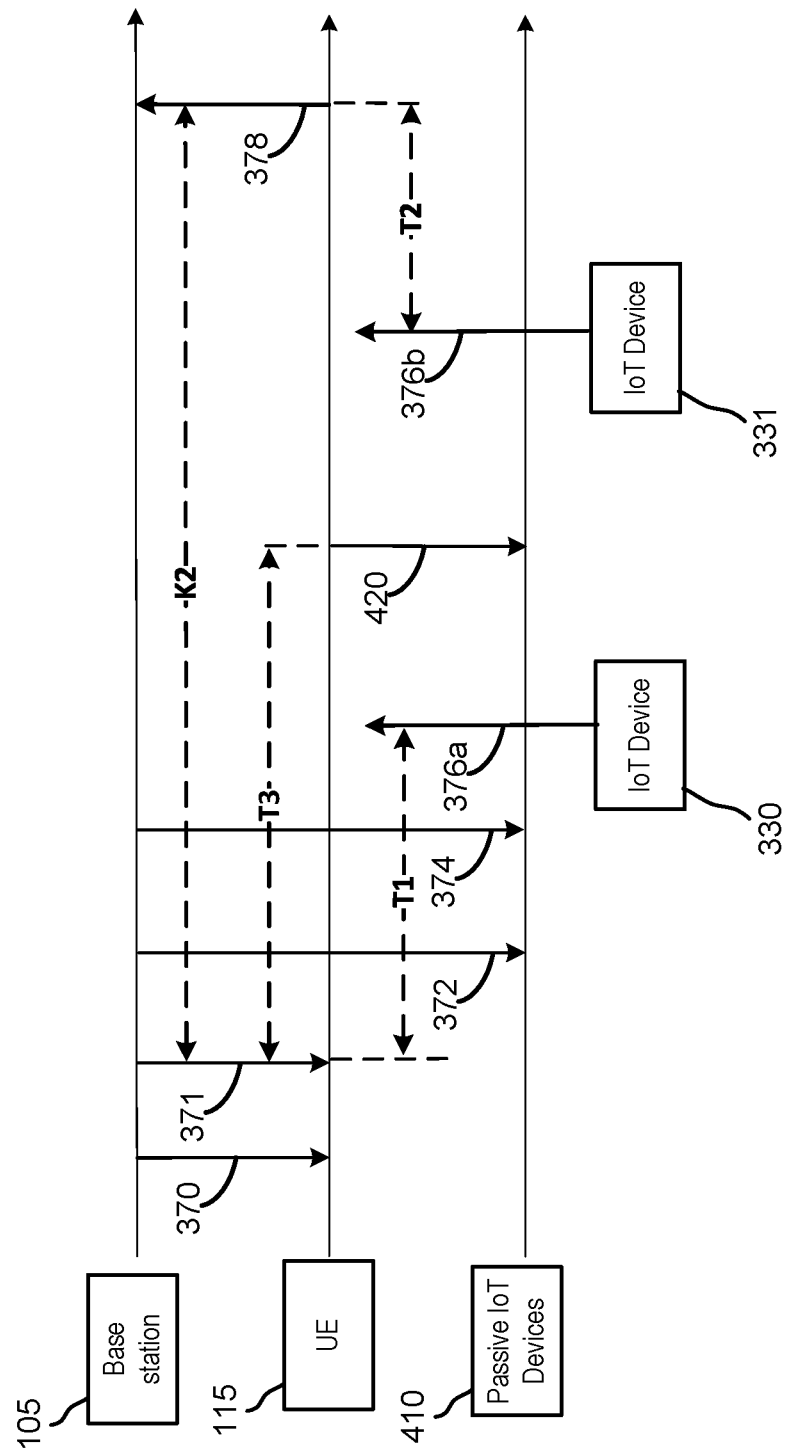
FIG. 4 is a timing diagram illustrating an example of operations for configuring an uplink relay for wireless powered IoT operations in accordance with aspects of the present disclosure

In the following discussion, operations of wireless communication system 300 will be discussed with additional reference to FIG. 4. FIG. 4 is a timing diagram illustrating an example of operations for configuring an uplink relay for wireless powered IoT operations in accordance with aspects of the present disclosure. It is also noted that in the discussion that follows, the term "backscatter transmission" may be used interchangeable with the term "reflection" to refer to transmissions from a wireless powered IoT device in response to an information signal transmission from a base station.

During operation of wireless communications system 300, base station 105 transmits configuration information for one or more wireless powered IoT devices to UE 115. For example, base station 105 may transmit to UE 115 configuration information 370, including configuration information of wireless powered IoT devices 410 (e.g., including wireless powered IoT device 330 and wireless powered IoT device 331). In aspects, base station 105 may be aware of the configuration of wireless powered IoT devices 410 based on pre-configuration, or based on dynamic signaling from wireless powered IoT devices 410.

In aspects, configuration information 370 may be transmitted to UE 115 by base station 105 in a radio resource control (RRC) command transmitted from the base station to the UE, and/or may be broadcasted by base station 105 in a system information broadcast (SIB) message and received by UE 115.

In aspects, configuration information 370 may include various information that may be used (e.g., by UE 115) to decode a transmission transmitted or reflected from wireless powered IoT devices 410. For example, configuration information 370 may include configuration information for each wireless powered IoT device of wireless powered IoT devices 410. For example, configuration information for wireless powered IoT device 330, as an exemplary configuration, may include an indication of the bandwidth deployment of the wireless powered IoT device 330 with respect to UE 115. In aspects, the bandwidth deployment indication may indicate whether wireless powered IoT device 330 is deployed as out-of-band, inband, or guard-band with respect to the bandwidth of UE 115. In the out-of-band deployment case, the bandwidth of wireless powered IoT device 330 may be in a different band than the bandwidth of UE 115. In the inband deployment case, the bandwidth of wireless powered IoT device 330 may be a same band as the bandwidth of UE 115. In the guard-band deployment case, the bandwidth of wireless powered IoT device 330 and the bandwidth of UE 115 may be adjacent to each other but separated by a guard.

In aspects, configuration information 370 for a wireless powered IoT device (e.g., wireless powered IoT device 330) may include an indication of a frequency configured for the wireless powered IoT device. In aspects, the frequency of the wireless powered IoT device may be indicate as a frequency range, or may be indicated as an absolute frequency point.

In aspects, configuration information 370 for a wireless powered IoT device (e.g., wireless powered IoT device 330) may include tag configuration information associated with the wireless powered IoT device. In aspects, the tag configuration information may include RFID tag configuration information and may include whether the IoT device uses on-off keying (OOK) modulation or frequency shift keying (FSK) modulation during operation (e.g., during backscatter transmissions or reflections). This information may be useful for UE 115 to be able to decode any reflection or backscatter transmission from wireless powered IoT device 330. In aspects, the tag configuration information for the wireless powered IoT device may include a number of payload bits that are included in a reflected transmission from the wireless powered IoT device. The tag configuration information for the wireless powered IoT device may include a response time associated with the wireless powered IoT device. This response time information for a wireless powered IoT device may be useful as UE 115 may be able to determine a timing gap between receiving a scheduling message from base station 105 scheduling UE 115 to relay reflections from the wireless powered IoT device to base station 105 and the time a reflection is expected. This may be due to the response time of the wireless powered IoT device between being triggered to reflect a transmission from base station 105 and the wireless powered IoT device being able to reflect the transmission.

In aspects, configuration information 370 for a wireless powered IoT device (e.g., wireless powered IoT device 330) may include bulk reading configurations that UE 115 may use to determine how to read and/or decode backscatter transmissions or reflections from more than one wireless powered IoT devices. For example, the bulk reading configuration may specify a protocol that may be used for the multiple reflections from the more than one wireless powered IoT devices. In aspects, the multiple reflected signals may be reflected using a query tree (QT) protocol or an ALOHA-based protocol.

During operation of wireless communications system 300, base station 105 transmits scheduling message 371 to UE 115. In aspects, scheduling message 371 may be configured to schedule or trigger UE 115 to begin operations for relaying backscatter transmissions or reflections from one or more wireless powered IoT device of wireless powered IoT device 410. In aspects, scheduling message 371 may include scheduling configuration for UE 115 to receive or detect backscatter transmissions or reflections from one or more wireless powered IoT device of wireless powered IoT device 410. For example, in the example illustrated in FIG. 4, scheduling message 371 may include scheduling configuration to schedule or trigger UE 115 to receive or detect backscatter transmissions or reflections from wireless powered IoT devices 330 and 331, and to relay those detected backscatter transmissions or reflections to base station 105.

In aspects, scheduling message 371 may be transmitted to UE 115 by base station 105 in an RRC command transmitted from the base station to the UE, and/or in a downlink control information (DCI) message.

In aspects, scheduling message 371 may include various scheduling information. For example, scheduling message 371 may include a configuration of a reception window over which UE 115 is to attempt to detect or receive expected backscatter transmissions or reflections from wireless powered IoT devices 330 and 331. In aspects, scheduling message 371 may include a number of backscatter transmissions that may be expected to be detected or received by UE 115 during the reception window. For example, in the example illustrated in FIG. 4, the number of expected backscatter transmissions during the reception window may be two backscatter transmissions, namely backscatter transmissions 376a and 376b. In aspects, the scheduling message 371 may additionally or alternatively include an indication of an RFID tag ID, an RFID tag prefix, a tax group ID, etc. identifying a number of expected backscatter transmissions as well as the source of the backscatter transmissions.

In aspects, the reception window may be configured by base station 105 by defining a minimum time gap T1 during which UE 115 may not detect or receive backscatter transmissions from wireless powered IoT device 330 or wireless powered IoT device 331. In aspects, minimum time gap T1 may be defined as a duration covering the time between a last symbol of scheduling message 371 and a first symbol of the first backscatter transmission (e.g., backscatter transmission 376a. During this time, UE 115 may be guaranteed or may guarantee that no attempts may be made to detect a backscatter transmission from wireless powered IoT device 330 or wireless powered IoT device 331. In aspects, minimum time gap T1 may provide a duration for allowing wireless powered IoT device 330 or wireless powered IoT device 331 to "wake up" (e.g., to power up reception and/or transmission circuitry, such as in response to receiving a power signal and/or an information signal from base station 105, and to reflect the information signal received from base station 105).

In aspects, the reception window may be configured by base station 105 by further defining a minimum time period T2, which may include a duration covering the time between a last symbol of the last backscatter transmission to be detected by UE 115 (e.g., backscatter transmission 376b) and an uplink resource scheduled for relaying (e.g., transmitting) the detected backscatter transmissions 376a and 376b by UE 115. In some aspects, minimum time period T2 may be defined based on a number of expected backscatter transmission within the reception window, which in this example may include two backscatter transmissions, namely backscatter transmissions 376a and 376b. In aspects, minimum time period T2 may be provisioned or configured for UE 115. UE 115 may prepare the relayed message (e.g., relayed backscatter transmissions 378) to be transmitted to base station 105. In aspects, minimum time period T2 may be defined based on UE 115's capabilities. For example, a shorter minimum time period T2 may be configured when UE 115's capabilities include high-capabilities, and/or a longer minimum time period T2 may be configured when UE 115's capabilities include low capabilities and/or a longer payload size of the relayed message (e.g., the number of expected backscatter transmissions, or number of bits per scatter transmission).

In aspects, scheduling message 371 may include an indication of an uplink resource that UE 115 may use for relaying (e.g., transmitting) the detected backscatter transmissions (e.g., backscatter transmissions 376a and 376b) to base station 105. In aspects, as will be discussed in more detail below, the scheduled uplink resources may be an uplink resource for a scheduled PUCCH transmission or for a scheduled PUSCH transmission. In aspects, scheduling message 371 may include a grant of the uplink resource.

In light of foregoing, in aspects, the reception window over which UE 115 is to attempt to detect or receive expected backscatter transmissions from wireless powered IoT devices 330 and 331 may be defined the window including [T1, K2-T2], where K2 is a duration between scheduling message 371 and the uplink resource scheduled for transmitting the detected backscatter transmissions 376a and 376b to base station 105. In aspects, base station 105 may indicate K2 in scheduling message 371. In aspects, a delta may be defined to include a time duration required by UE 115 to detect and process the backscatter signals of the one or more wireless powered IoT devices from which backscatter transmissions may be expected during the reception window (e.g., backscatter transmissions 376a and 376b expected from wireless powered IoT devices 330 and 331, respectively). In aspects, UE 115 may not expect K2, as indicated by base station 105, to be smaller than T1+T2+ delta. In aspects, delta may be defined based on UE 115's capabilities. For example, a shorter delta may be configured when UE 115's capabilities include high-capabilities, and/or a longer delta T2 may be configured when UE 115's capabilities include low capabilities and/or a longer payload size of the relayed message (e.g., the number of expected backscatter transmissions, or number of bits per scatter transmission).

As noted above, in some aspects, the detected backscatter transmissions may be relayed to base station 105 over an uplink resource schedules for a PUCCH transmission or a PUSCH transmission. In aspects, where the uplink resource over which the detected backscatter transmissions may be relayed to base station 105 is scheduled for a PUCCH transmission, scheduling message 371 may include an expected payload size for the relayed backscatter transmissions (e.g., a payload size of the backscatter transmissions expected to be detected by UE 115 during the reception window). In aspects, the expected payload size may be a fixed size.

In aspects, where the uplink resource over which the detected backscatter transmissions may be relayed to base station 105 is scheduled for a PUSCH transmission, rather than a fixed size for the expected payload size for the relayed backscatter transmissions (e.g., a payload size of the backscatter transmissions expected to be detected by UE 115 during the reception window), the payload size of the relayed backscatter transmissions may be based on the received backscatter signals within the reception window.

During operation of wireless communications system 300, base station 105 transmits power signal 372 to one or more wireless powered IoT devices 410 (e.g., including wireless powered IoT device 330 and wireless powered IoT device 331). In aspects, power signal 372 may be configured to provide energy to power the one or more wireless powered IoT devices. Power signal 372 may be a continuous wave transmission.

In aspects, wireless powered IoT device 330 and/or wireless powered IoT device 331 may detect power signal 372 and may harvest energy from power signal 372 (e.g., may harvest RF energy from power signal 372). The harvested energy may be used by wireless powered IoT device 330 and/or wireless powered IoT device 331 to power reception and/or transmission circuitry of wireless powered IoT device 330 and/or wireless powered IoT device 331. In aspects, wireless powered IoT device 330 and/or wireless powered IoT device 331 may use the harvested energy directly to power the reception and/or transmission circuitry. In some aspects, the reception and/or transmission circuitry of wireless powered IoT device 330 and/or wireless powered IoT device 331 may be powered using a battery of wireless powered IoT device 330 and/or wireless powered IoT device 331, and in these implementations wireless powered IoT device 330 and/or wireless powered IoT device 331 may use the harvested energy to charge a battery of wireless powered IoT device 330 and/or wireless powered IoT device 331.

During operation of wireless communications system 300, base station 105 transmits information signal 374 to one or more wireless powered IoT devices 410 (e.g., including wireless powered IoT device 330 and wireless powered IoT device 331). In aspects, information signal 374 may be configured to trigger the one or more wireless powered IoT devices to perform backscatter transmission. For example, information signal 374 may trigger wireless powered IoT device 330 and wireless powered IoT device 331 to transmit backscatter transmissions 376a and 376b, respectively.

During operation of wireless communications system 300, UE 115 detects one or more backscatter transmissions or reflections from one or more wireless powered IoT device of wireless powered IoT device 410, in accordance with scheduling configuration in scheduling message 371. For example, UE 115 may detect backscatter transmissions from wireless powered IoT devices indicated in scheduling message 371 (e.g., wireless powered IoT device 330 and wireless powered IoT device 331 in this example). In this example, UE 115 may detect backscatter transmissions 376a and/or 376b from wireless powered IoT device 330 and/or wireless powered IoT device 331, respectively, within the reception window indicated in scheduling message 371. In aspects, UE 115 may receive and/or decode backscatter transmissions 376a and/or 376b based on the configuration information for wireless powered IoT device 330 and/or wireless powered IoT device 331 received from base station 105 (e.g., in configuration information 370).

In aspects, UE 115 may relay the detected backscatter transmissions (e.g., backscatter transmissions 376a and/or 376b) to base station 105 using the uplink resource for relaying the detected backscatter transmission scheduled by scheduling message 371. For example, UE 115 may transmit relayed backscatter transmissions 378 to base station 105.

In aspects, relaying the detected backscatter transmissions to base station 105 may include determining that the detected backscatter transmissions are to be transmitted to base station 105 in a PUCCH transmission. In these aspects, UE 115 may determine a fixed size for the payload of relayed backscatter transmissions 378 based on scheduling message 371. For example, scheduling message 371 may include an indication of the expected size (e.g., fixed size in bits) of the backscatter signals expected during the reception window. In aspects, UE 115 may generate a payload including a number of bits equal to the fixed size, and may include information bits corresponding to the received backscatter transmissions in the payload. In aspects, a set of bits in (e.g., a portion of) the payload may be used to indicate any backscatter transmissions (e.g., by indicating a wireless powered IoT device tag ID) that were expected during the reception window, but that were not detected by UE 115 during the reception window. In aspects, the payload may be multiplexed to the PUCCH transmission, and the multiplexed PUCCH transmission may be transmitted to base station 105 as relayed backscatter transmissions 378.

In aspects, relaying the detected backscatter transmissions to base station 105 may include determining that the detected backscatter transmissions are to be transmitted to base station 105 in a PUSCH transmission. In these aspects, UE 115 may generate a payload to include information bits corresponding to the received backscatter transmissions. In aspects, the size of the payload may be based on the number of received backscatter transmissions. In aspects, a first set of bits (e.g., a first portion) of the payload may be used to indicate any detected backscatter transmissions that were received during the reception window. In aspects, a second set of bits (e.g., a second portion) of the payload may be used to indicate any backscatter transmissions that were expected during the reception window, but that were not detected by UE 115 during the reception window. In aspects, a third set of bits (e.g., a third portion) of the payload may be used to indicate any detected backscatter transmissions conflicting with multiple wireless powered IoT device tag IDs. For example, multiple backscatter transmissions that were detected during the reception window may be from a same wireless powered IoT device tag. In this case, these multiple backscatter transmissions may be indicated in the third set of bits of the payload. In aspects, the payload may be multiplexed to the PUSCH transmission, and the multiplexed PUSCH transmission may be transmitted to base station 105 as relayed backscatter transmissions 378.

In aspects, during the reception window, it is possible that wireless powered IoT devices triggered to transmit backscatter transmissions during the reception window may lose energy due to, for example, capacitance circuitry after backing off the transmission for some time. In these cases, UE 115 may not be able to detect a backscatter transmission from these wireless powered IoT devices. For example, wireless powered IoT device 331 may lose energy after being powered and triggered by power signal 372 and information signal 374, respectively, and as a result, backscatter transmission 376b may not be transmitted with sufficient energy to be detected by UE 115. In aspects, in order to address the above issue, UE 115 may be configured (e.g., via scheduling message 371) with a power timer T3. In aspects, UE 115 may be configured to, upon the expiration of power timer T3, transmit power signal 420. Power signal 420 may be configured to provide energy to power the one or more wireless powered IoT devices. In these aspects, wireless powered IoT device 331 may be able to harvest energy from power signal 420 for transmitting backscatter transmission 376*b* with sufficient energy to be detected by UE 115. In aspects, UE 115 may be configured to transmit power signal 420 upon the expiration of power timer T3, but only when there remain expected backscatter transmissions within the reception window that have not yet been detected. For example, UE 115 may expect a backscatter transmission from wireless powered IoT device 331, but at the expiration of power timer T3, a backscatter transmission from wireless powered IoT device 331 has not been detected or received by UE 115. As a result, UE 115 may transmit power signal 420. In an example where all backscatter transmissions expected within the reception window have been detected or received upon the expiration of power timer T3, UE 115 may not transmit power signal 420.

Figure 5:
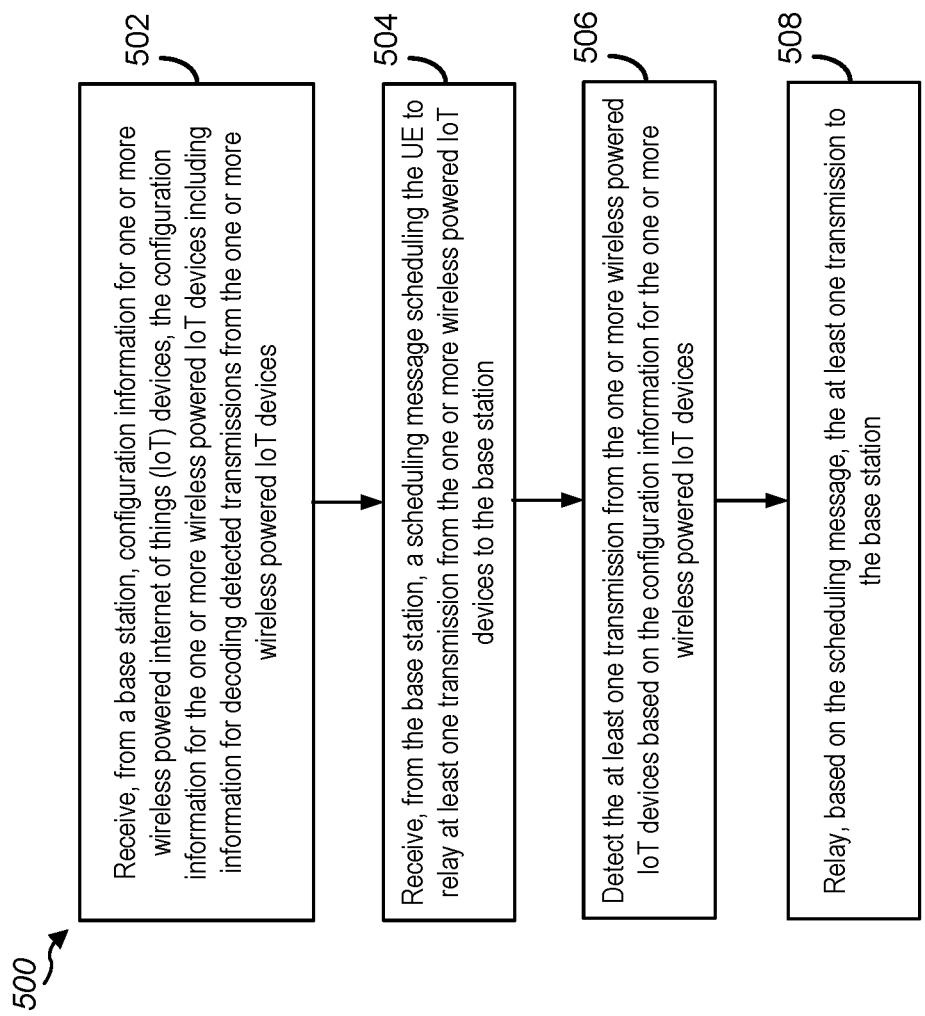
FIG. 5 is a flow diagram illustrating an example process that supports mechanisms for configuring an uplink relay for wireless powered IoT operations in a wireless communication system according to one or more aspects.
Figure 8:
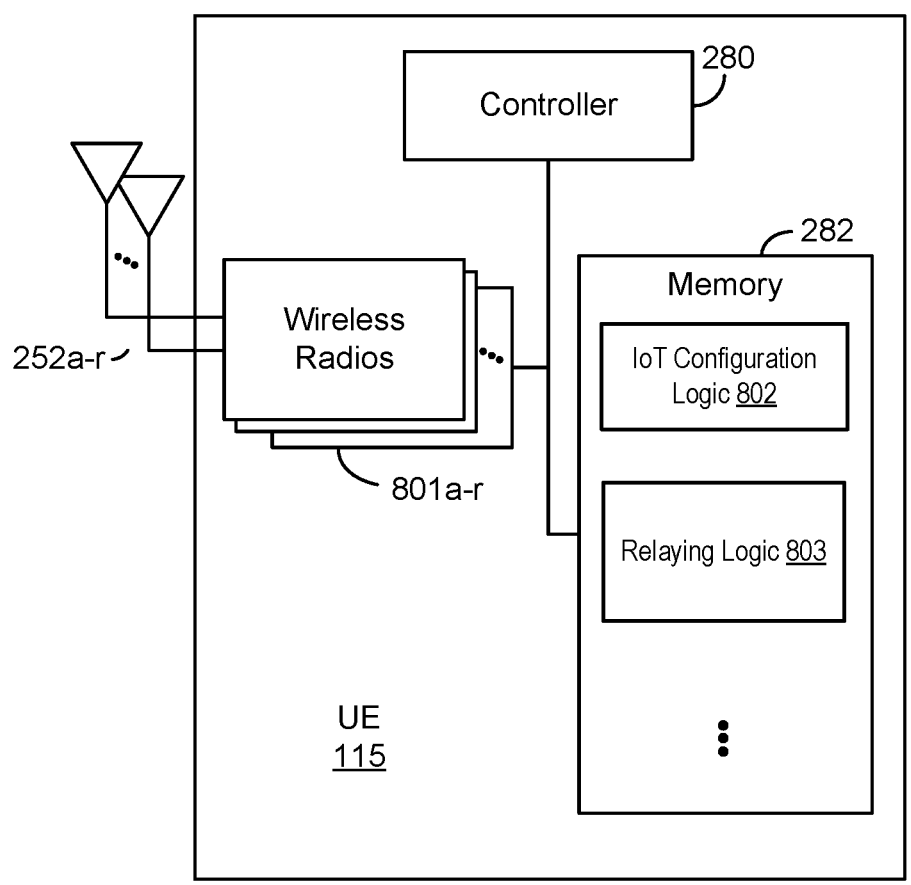
FIG. 8 is a block diagram of an example UE that supports mechanisms for configuring an uplink relay for wireless powered IoT operations in a wireless communication system according to one or more aspects.

FIG. 5 is a flow diagram illustrating an example process 500 that provides for configuring an uplink relay for wireless powered IoT operations in a wireless communication system according to one or more aspects. Operations of process 500 may be performed by a UE, such as UE 115 described above with reference to FIGS. 1-4. For example, example operations (also referred to as "blocks") of process 500 may enable UE 115 to support mechanisms for configuring an uplink relay for wireless powered IoT operations. FIG. 8 is a block diagram illustrating UE 115 configured according to aspects of the present disclosure. UE 115 includes the structure, hardware, and components as illustrated in FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 801*a-r* and antennas 252*a-r*. Wireless radios 801*a-r* includes various components and hardware, as illustrated in FIG. 2, including modulator/demodulators 254*a-r*, MIMO detector 256, receive processor 258, transmit processor 264, and TX MIMO processor 266.

At block 502 of process 500, a UE (e.g., UE 115) receives, from a base station (e.g., base station 105), configuration information for one or more wireless powered internet of things (IoT) devices (e.g., including wireless powered IoT device 330). In aspects, the configuration information for the one or more wireless powered IoT devices includes information for decoding detected transmissions from the one or more wireless powered IoT devices. In order to implement the functionality for such operations, UE 115, under control of controller/processor 280, may receive, from the base station, configuration information for one or more wireless powered IoT devices via wireless radios 801*a-r* and antennas 252*a-r*. In aspects, UE 115 may perform operations to receive, from the base station, configuration information for one or more wireless powered IoT devices according to operations and functionality as described above with reference to UE 115 and as illustrated in FIGS. 1-4.

At block 504 of process 500, UE 115 receives, from base station 105, a scheduling message scheduling the UE to relay at least one transmission from the one or more wireless powered IoT devices to the base station. In order to implement the functionality for such operations, UE 115, under control of controller/processor 280, may receive, from the base station, the scheduling message scheduling the UE to relay the at least one transmission from the one or more wireless powered IoT devices to the base station via wireless radios 801*a-r* and antennas 252*a-r*. In aspects, UE 115 may perform operations to receive, from the base station, the scheduling message scheduling the UE to relay the at least one transmission from the one or more wireless powered IoT devices to the base station according to operations and functionality as described above with reference to UE 115 and as illustrated in FIGS. 1-4.

At block 506 of process 500, UE 115 detects the at least one transmission from the one or more wireless powered IoT devices based on the configuration information for the one or more wireless powered IoT devices. In order to implement the functionality for such operations, UE 115, under control of controller/processor 280, executes IoT configuration logic 802, stored in memory 282. The functionality implemented through the execution environment of IoT configuration logic 802 allows for UE 115 to perform operations to detect the at least one transmission from the one or more wireless powered IoT devices based on the configuration information for the one or more wireless powered IoT devices according to the various aspects herein. In aspects, UE 115 may perform operations to detect the at least one transmission from the one or more wireless powered IoT devices based on the configuration information for the one or more wireless powered IoT devices according to operations and functionality as described above with reference to UE 115 and as illustrated in FIGS. 1-4.

At block 508 of process 500, UE 115 relay, based on the scheduling message, the at least one transmission to base station 105. In order to implement the functionality for such operations, UE 115, under control of controller/processor 280, executes relaying logic 803, stored in memory 282. The functionality implemented through the execution environment of relaying logic 803 allows for UE 115 to perform operations to relay, based on the scheduling message, the at least one transmission to base station 105 according to the various aspects herein. In aspects, UE 115 may perform operations to relay, based on the scheduling message, the at least one transmission to base station 105 according to operations and functionality as described above with reference to UE 115 and as illustrated in FIGS. 1-4.

Figure 6:
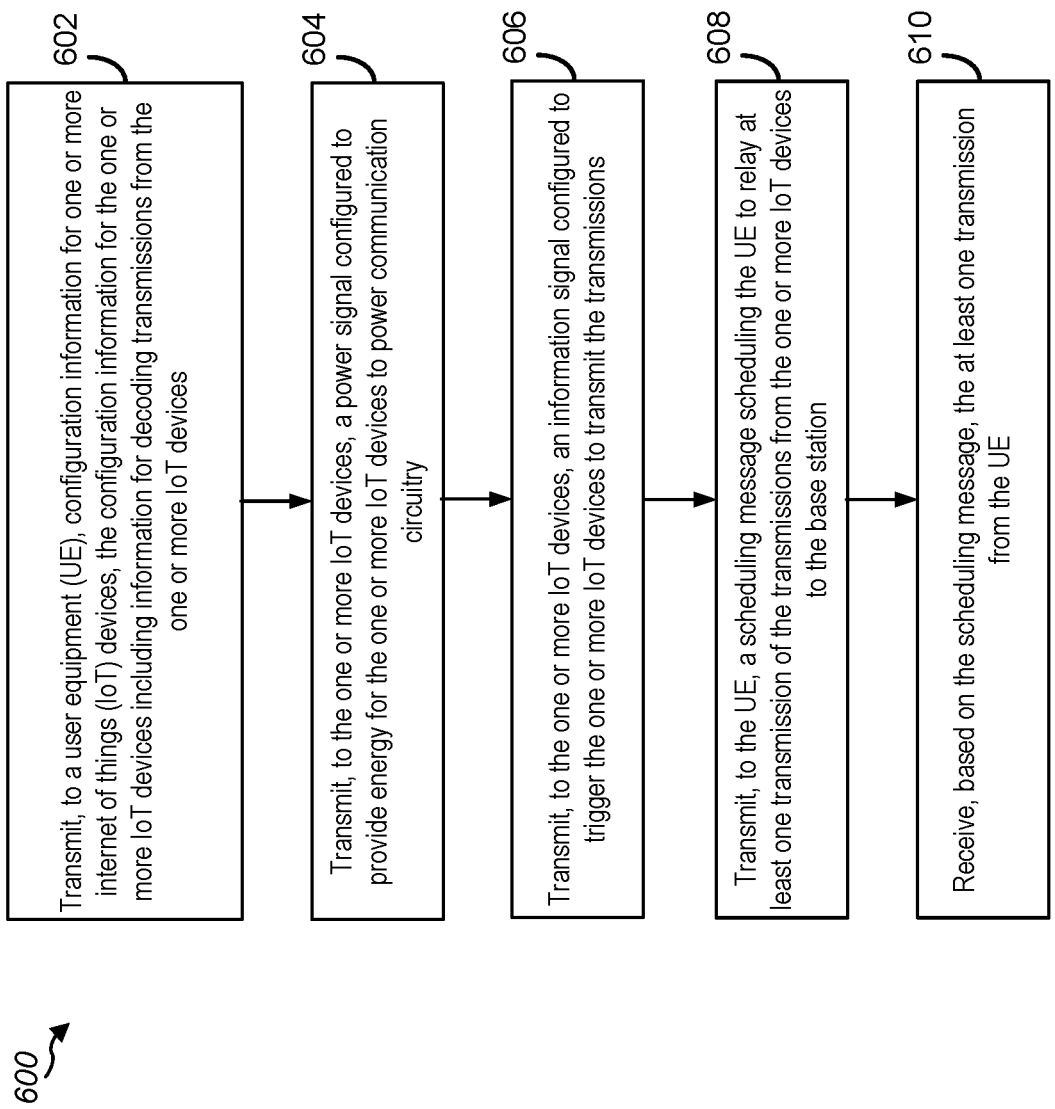
FIG. 6 is a flow diagram illustrating an example process that supports mechanisms for configuring an uplink relay for wireless powered IoT operations in a wireless communication system according to one or more aspects.
Figure 9:
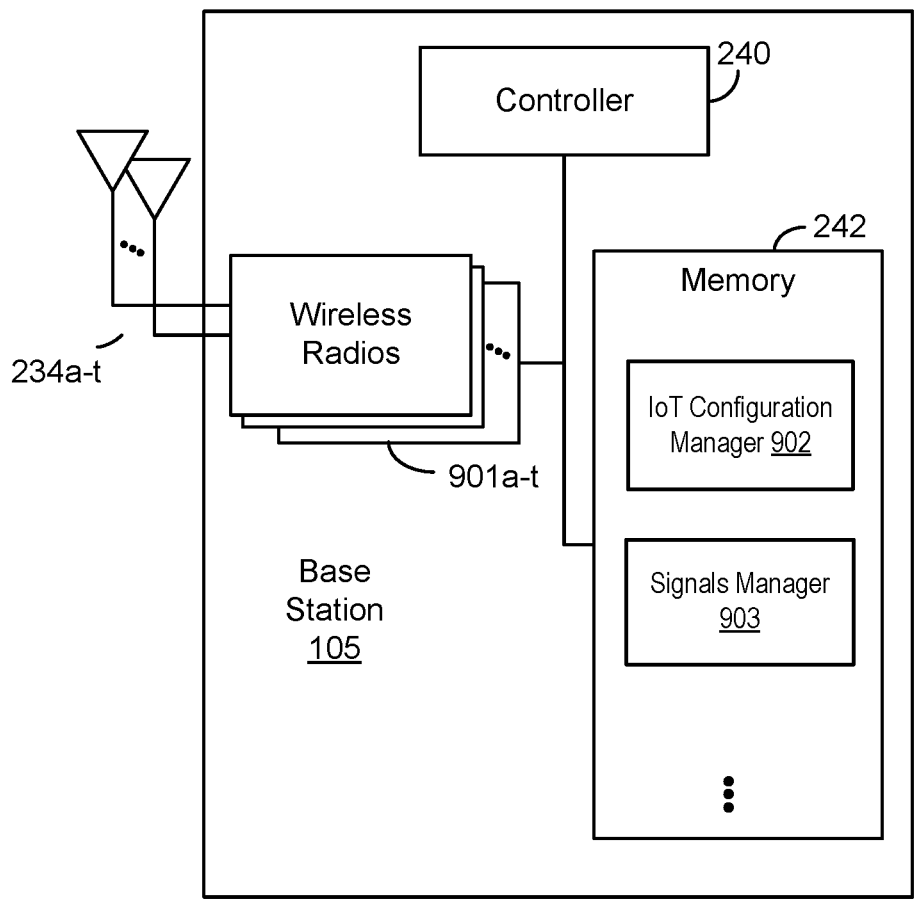
FIG. 9 is a block diagram of an example base station that supports mechanisms for configuring an uplink relay for wireless powered IoT operations in a wireless communication system according to one or more aspects.

FIG. 6 is a block diagram illustrating an example process 600 that provides mechanisms for configuring an uplink relay for wireless powered IoT operations in a wireless communication system according to one or more aspects. Operations of process 600 may be performed by a base station, such as base station 105 described above with reference to FIGS. 1-4, or described with reference to FIG. 9. FIG. 9 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 901*a-t* and antennas 234*a-t*. Wireless radios 901*a-t* includes various components and hardware, as illustrated in FIG. 2 for base station 105, including modulator/demodulators 232*a-t*, MIMO detector 236, receive processor 238, transmit processor 220, and TX MIMO processor 230.

At block 602 of process 600, a base station (e.g., base station 105) transmits, to a UE (e.g., UE 115), configuration information for one or more IoT devices (e.g., including IoT device 330). In aspects, the configuration information for the one or more IoT devices includes information for decoding transmissions from the one or more IoT devices. In order to implement the functionality for such operations, base station 105, under control of controller/processor 240, may transmit, to UE 115, the configuration information for the one or more IoT devices via wireless radios 901a-r and antennas 234a-t. In aspects, base station 105, under control of controller/processor 240, executes IoT configuration manager 902, stored in memory 242, to perform operations for generating and/or configuring the configuration information according to the various aspects herein. In aspects, base station 105 may perform operations to transmit, to UE 115, the configuration information for the one or more IoT devices according to operations and functionality as described above with reference to base station 105 and as illustrated in FIGS. 1-4.

At block 604 of process 600, base station 105 transmits, to the one or more IoT devices (e.g., including IoT device 330) a power signal configured to provide energy for the one or more IoT devices to power communication circuitry. In order to implement the functionality for such operations, base station 105, under control of controller/processor 240, may transmit, to the one or more IoT devices (e.g., including IoT device 330) the power signal via wireless radios 901a-r and antennas 234a-t. In aspects, base station 105, under control of controller/processor 240, executes signals manager 903, stored in memory 242, to perform operations for generating and/or configuring the power signal according to the various aspects herein. In aspects, base station 105 may perform operations to transmit, to the one or more IoT devices (e.g., including IoT device 330) the power signal according to operations and functionality as described above with reference to base station 105 and as illustrated in FIGS. 1-4.

At block 606 of process 600, base station 105 transmits, to the one or more IoT devices (e.g., including IoT device 330) an information signal configured to trigger the one or more IoT devices to transmit the transmissions. In order to implement the functionality for such operations, base station 105, under control of controller/processor 240, may transmit, to the one or more IoT devices (e.g., including IoT device 330) the information signal via wireless radios 901a-r and antennas 234a-t. In aspects, base station 105, under control of controller/processor 240, executes signals manager 903, stored in memory 242, to perform operations for generating and/or configuring the information signal according to the various aspects herein. In aspects, base station 105 may perform operations to transmit, to the one or more IoT devices (e.g., including IoT device 330) the information signal according to operations and functionality as described above with reference to base station 105 and as illustrated in FIGS. 1-4.

At block 608 of process 600, base station 105 transmits, to UE 115, a scheduling message scheduling UE 115 to relay at least one transmission of the transmissions from the one or more IoT devices to base station 105. In order to implement the functionality for such operations, base station 105, under control of controller/processor 240, may transmit, to UE 115, the scheduling message scheduling UE 115 to relay the at least one transmission of the transmissions from the one or more IoT devices to base station 105 via wireless radios 901a-r and antennas 234a-t. In aspects, base station 105 may perform operations to transmit, to UE 115, the scheduling message scheduling UE 115 to relay the at least one transmission of the transmissions from the one or more IoT devices to base station 105 according to operations and functionality as described above with reference to base station 105 and as illustrated in FIGS. 1-4.

At block 610 of process 600, base station 105 receives, based on the scheduling message, the at least one transmission from UE 115. In order to implement the functionality for such operations, base station 105, under control of controller/processor 240, may receive, based on the scheduling message, the at least one transmission from UE 115 via wireless radios 901a-r and antennas 234a-t. In aspects, base station 105 may perform operations to receive, based on the scheduling message, the at least one transmission from UE 115 according to operations and functionality as described above with reference to base station 105 and as illustrated in FIGS. 1-4.

Figure 7:
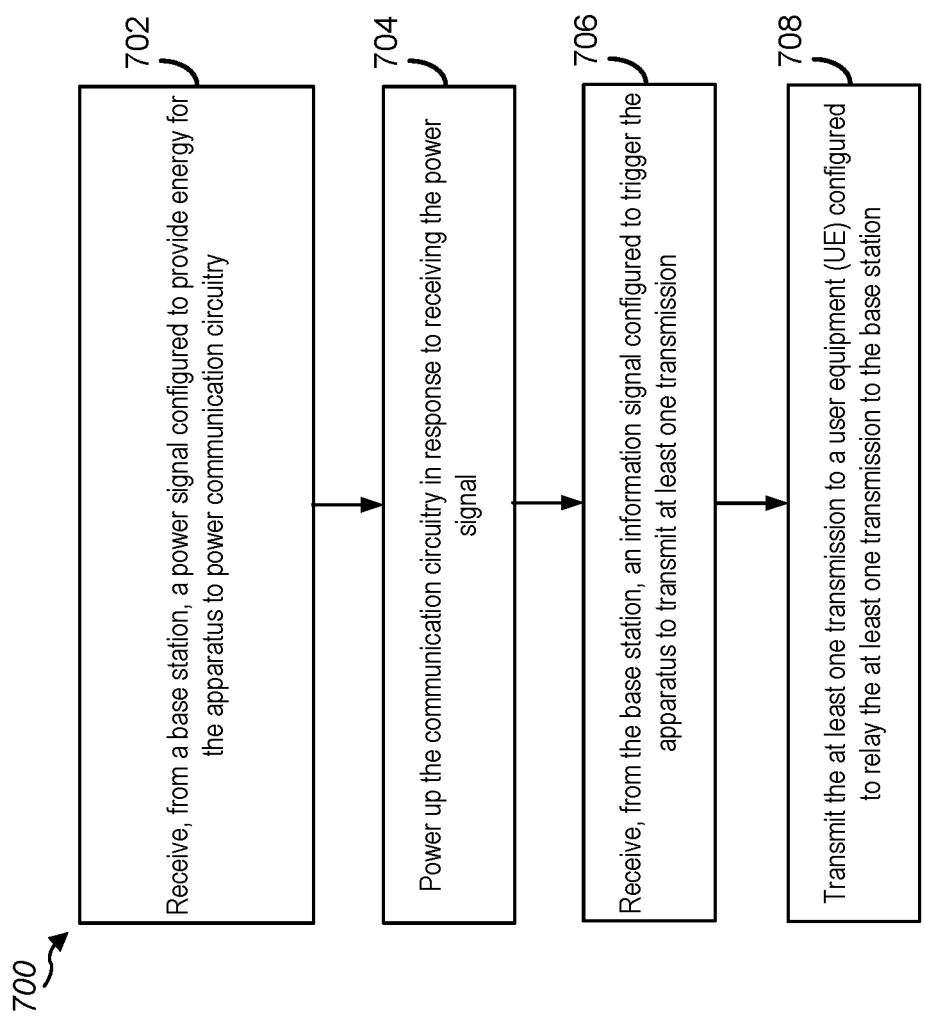
FIG. 7 is a flow diagram illustrating an example process that supports mechanisms for configuring an uplink relay for wireless powered IoT operations in a wireless communication system according to one or more aspects.

FIG. 7 is a block diagram illustrating an example process 700 that provides mechanisms for configuring an uplink relay for wireless powered IoT operations in a wireless communication system according to one or more aspects. Operations of process 700 may be performed by an apparatus (e.g., a wireless powered IoT device), such as wireless powered IoT device 330 described above with reference to FIGS. 1-4. At block 702 of process 700, the apparatus receives, from a base station (e.g., base station 105), a power signal configured to provide energy for the apparatus to power communication circuitry. In aspects, wireless powered IoT device 330 may perform operations to receive, from base station 105, the power signal according to operations and functionality as described above with reference to wireless powered IoT device 330 and as illustrated in FIGS. 1-4.

At block 704 of process 700, the apparatus powers up the communication circuitry in response to receiving the power signal. In aspects, wireless powered IoT device 330 may perform operations to power up the communication circuitry in response to receiving the power signal according to operations and functionality as described above with reference to wireless powered IoT device 330 and as illustrated in FIGS. 1-4.

At block 706 of process 700, the apparatus receives, from base station 105, an information signal configured to trigger the apparatus to transmit at least one transmission. In aspects, wireless powered IoT device 330 may perform operations to receive, from base station 105, the information signal according to operations and functionality as described above with reference to wireless powered IoT device 330 and as illustrated in FIGS. 1-4.

At block 708 of process 700, the apparatus transmits the at least one transmission to a UE (e.g., UE 115) configured to relay the at least one transmission to base station 105. In aspects, wireless powered IoT device 330 may perform operations to transmit the at least one transmission to UE 115 configured to relay the at least one transmission to base station 105 according to operations and functionality as described above with reference to wireless powered IoT device 330 and as illustrated in FIGS. 1-4.

In one or more aspects, techniques for supporting mechanisms for configuring an uplink relay for wireless powered IoT operations in a wireless communication system according to one or more aspects may include additional aspects, such as any single aspect or any combination of aspects described below or in connection with one or more other processes or devices described elsewhere herein. In a first aspect, supporting mechanisms for configuring an uplink relay for wireless powered IoT operations in a wireless communication system may include an apparatus configured to receive, from a base station, configuration information for one or more wireless powered IoT devices, the configuration information for the one or more wireless powered IoT devices including information for decoding detected transmissions from the one or more wireless powered IoT devices, to receive, from the base station, a scheduling message scheduling the UE to relay at least one transmission from the one or more wireless powered IoT devices to the base station, to detect the at least one transmission from the one or more wireless powered IoT devices based on the configuration information for the one or more wireless powered IoT devices, and to relay, based on the scheduling message, the at least one transmission to the base station. Additionally, the apparatus may perform or operate according to one or more aspects as described below. In some implementations, the apparatus includes a wireless device, such as a UE (e.g., UE 115 as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, the configuration information for the one or more wireless powered IoT devices includes one or more of an indication of whether a bandwidth of the one or more wireless powered IoT devices is out of band, inband, or in a band with a guard with respect to a bandwidth of the UE, an indication of a frequency associated with the one or more wireless powered IoT devices, and/or tag configuration information associated with the one or more wireless powered IoT devices.

In a third aspect, alone or in combination with the second aspect, the frequency associated with the one or more wireless powered IoT devices is indicated as one or more of a frequency range, and/or an absolute frequency point.

In a fourth aspect, alone or in combination with one or more of the second aspect through the third aspect, the tag configuration associated with a wireless powered IoT device indicates whether the wireless powered IoT device uses OOK modulation or FSK modulation, a number of payload bits in a reflected transmission from the wireless powered IoT device, and/or a response time associated with the wireless powered IoT device or a bulk reading configuration.

In a fifth aspect, alone or in combination with one or more of the first aspect through the fourth aspect, the configuration information for the one or more wireless powered IoT devices is received by the UE in an RRC command transmitted from the base station to the UE, and/or a SIB message broadcast by the base station.

In a sixth aspect, alone or in combination with one or more of the first aspect through the fifth aspect, the scheduling message from the base station includes an indication of a reception window for receiving the at least one transmission from the one or more wireless powered IoT devices, an indication of a minimum time gap between an end of the scheduling message and a beginning of a reception of a first transmission of the at least one transmission from the one or more wireless powered IoT devices, an indication of a number of transmissions in the at least one transmission from the one or more wireless powered IoT devices expected to be received during the reception window, an indication of wireless powered IoT devices in the one or more wireless powered IoT devices from which a transmission of the at least one transmission is expected during the reception window, an indication of an uplink resource scheduled for transmitting the detected at least one transmission from the UE to the base station, and/or an indication of a minimum time period between an end of a reception of a final transmission of the at least one transmission from the one or more wireless powered IoT devices and a beginning of the uplink resource.

In a seventh aspect, alone or in combination with the sixth aspect, the UE is configured to forego attempting to detect the at least one transmission from the one or more wireless powered IoT devices during the minimum time gap.

In an eighth aspect, alone or in combination with one or more of the first aspect through the seventh aspect, the scheduling message is received by the UE in an RRC command transmitted from the base station to the UE, and/or a DCI message from the base station.

In a ninth aspect, alone or in combination with one or more of the first aspect through the eighth aspect, the techniques of the first aspect include determining that a power timer has expired.

In a tenth aspect, alone or in combination with one or more of the first aspect through the ninth aspect, the techniques of the first aspect include determining whether all transmissions in the at least one transmission from the one or more wireless powered IoT devices have been detected by the UE before expiration of the power timer.

In an eleventh aspect, alone or in combination with one or more of the first aspect through the tenth aspect, the techniques of the first aspect include transmitting, in response to a determination that all transmissions in the at least one transmission from the one or more wireless powered IoT devices have not been detected by the UE before expiration of the power timer, a power signal configured to provide energy to the one or more wireless powered IoT devices.

In a twelfth aspect, alone or in combination with one or more of the first aspect through the eleventh aspect, the power timer is configured to start at an end of the scheduling message or reception of a first transmission of the at least one transmission from the one or more wireless powered IoT devices.

In a thirteenth aspect, alone or in combination with one or more of the first aspect through the twelfth aspect, detecting the at least one transmission from the one or more wireless powered IoT devices based on the configuration information for the one or more wireless powered IoT devices includes receiving the at least one transmission from the one or more wireless powered IoT devices.

In a fourteenth aspect, alone or in combination with one or more of the first aspect through the thirteenth aspect, detecting the at least one transmission from the one or more wireless powered IoT devices based on the configuration information for the one or more wireless powered IoT devices includes decoding, based on the configuration information for the one or more wireless powered IoT devices, the at least one transmission from the one or more wireless powered IoT devices.

In a fifteenth aspect, alone or in combination with one or more of the first aspect through the fourteenth aspect, relaying the at least one transmission to the base station includes determining to transmit the relayed at least one transmission to the base station in a PUCCH transmission.

In a sixteenth aspect, alone or in combination with one or more of the first aspect through the fifteenth aspect, relaying the at least one transmission to the base station includes determining, based on the scheduling message, a fixed size for the relayed at least one transmission.

In a seventeenth aspect, alone or in combination with one or more of the first aspect through the sixteenth aspect, relaying the at least one transmission to the base station includes multiplexing the relayed at least one transmission to the PUCCH transmission.

In an eighteenth aspect, alone or in combination with one or more of the first aspect through the seventeenth aspect, relaying the at least one transmission to the base station includes transmitting the relayed at least one transmission multiplexed to the PUCCH transmission in an uplink resource scheduled for transmitting the detected at least one transmission from the UE to the base station.

In a nineteenth aspect, alone or in combination with one or more of the first aspect through the eighteenth aspect, the relayed at least one transmission further includes at least a portion for indicating undetected transmissions of the at least one transmission.

In a twentieth aspect, alone or in combination with one or more of the first aspect through the nineteenth aspect, relaying the at least one transmission to the base station includes determining to transmit the relayed at least one transmission to the base station in a PUSCH transmission.

In a twenty-first aspect, alone or in combination with one or more of the first aspect through the twentieth aspect, relaying the at least one transmission to the base station includes determining, based on the scheduling message, a size for the relayed at least one transmission based on a number of detected transmissions of the at least one transmission.

In a twenty-second aspect, alone or in combination with one or more of the first aspect through the twenty-first aspect, relaying the at least one transmission to the base station includes multiplexing the relayed at least one transmission to the PUSCH transmission.

In a twenty-third aspect, alone or in combination with one or more of the first aspect through the twenty-second aspect, relaying the at least one transmission to the base station includes transmitting the relayed at least one transmission multiplexed to the PUSCH transmission in an uplink resource scheduled for transmitting the detected at least one transmission from the UE to the base station.

In a twenty-fourth aspect, alone or in combination with one or more of the first aspect through the twenty-third aspect, the relayed at least one transmission further includes a first portion for indicating detected transmissions of the at least one transmission, a second portion for indicating undetected transmissions of the at least one transmission, and/or a third portion for indicating transmissions of the at least one transmission detected from a same wireless powered IoT device.

In a twenty-fifth aspect, techniques for supporting mechanisms for configuring an uplink relay for wireless powered IoT operations in a wireless communication system may include an apparatus configured to transmit, to a UE, configuration information for one or more IoT devices, the configuration information for the one or more IoT devices including information for decoding transmissions from the one or more IoT devices, to transmit; to the one or more IoT devices, a power signal configured to provide energy for the one or more IoT devices to power communication circuitry, to transmit, to the one or more IoT devices, an information signal configured to trigger the one or more IoT devices to transmit the transmissions, to transmit, to the UE, a scheduling message scheduling the UE to relay at least one transmission of the transmissions from the one or more IoT devices to the base station, and to receive, based on the scheduling message, the at least one transmission from the UE. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twenty-sixth aspect, alone or in combination with one or more of the twenty-fifth aspect through the twenty-fifth aspect, the configuration information for the one or more wireless powered IoT devices includes one or more of an indication of whether a bandwidth of the one or more wireless powered IoT devices is out of band, inband, or in a band with a guard with respect to a bandwidth of the UE, an indication of a frequency associated with the one or more wireless powered IoT devices, and/or tag configuration information associated with the one or more wireless powered IoT devices.

In a twenty-seventh aspect, alone or in combination with the twenty-sixth aspect, the frequency associated with the one or more wireless powered IoT devices is indicated as one or more of a frequency range, and/or an absolute frequency point.

In a twenty-eighth aspect, alone or in combination with one or more of the twenty-sixth aspect through the twenty-seventh aspect, the tag configuration associated with a wireless powered IoT device indicates whether the wireless powered IoT device uses OOK modulation or FSK modulation, a number of payload bits in a reflected transmission from the wireless powered IoT device, and/or a response time associated with the wireless powered IoT device or a bulk reading configuration.

In a twenty-ninth aspect, alone or in combination with one or more of the twenty-fifth aspect through the twenty-eighth aspect, the configuration information for the one or more wireless powered IoT devices is transmitted to the UE in an RRC command transmitted from the base station to the UE, and/or a SIB message broadcast by the base station.

In a thirtieth aspect, alone or in combination with one or more of the twenty-fifth aspect through the twenty-ninth aspect, the scheduling message includes an indication of a reception window for the UE to receive the at least one transmission from the one or more IoT devices, an indication of a minimum time gap between an end of the scheduling message and a beginning of a reception of a first transmission of the at least one transmission from the one or more IoT device, an indication of a number of transmissions in the at least one transmission from the one or more IoT devices expected to be received during the reception window, an indication of IoT devices in the one or more IoT device from which a transmission of the at least one transmission is expected during the reception window, an indication of an uplink resource scheduled for transmitting the detected at least one transmission from the UE to the base station, and/or an indication of a minimum time period between an end of a reception of a final transmission of the at least one transmission from the one or more IoT device and a beginning of the uplink resource.

In a thirty-first aspect, alone or in combination with the thirtieth aspect, the UE is configured to forego attempting to detect the at least one transmission from the one or more IoT device during the minimum time gap.

In a thirty-second aspect, alone or in combination with one or more of the twenty-fifth aspect through the thirty-first aspect, the scheduling message is transmitted to the UE in an RRC command transmitted from the base station to the UE, and/or a DCI message.

In a thirty-third aspect, alone or in combination with one or more of the twenty-fifth aspect through the thirty-second aspect, the scheduling message further includes a power timer.

In a thirty-fourth aspect, alone or in combination with the thirty-third aspect, the power timer indicates to the UE to transmit, upon expiration of the power timer, a power signal configured to provide energy to the one or more IoT devices when all transmissions in the at least one transmission expected from the one or more IoT devices have not been detected by the UE.

In a thirty-fifth aspect, alone or in combination with one or more of the twenty-fifth aspect through the thirty-fourth aspect, the power timer is configured to start, at the UE, at an end of the scheduling message or at reception of a first transmission of the at least one transmission from the one or more IoT device.

In a thirty-sixth aspect, alone or in combination with one or more of the twenty-fifth aspect through the thirty-fifth aspect, the techniques of the twenty-fifth aspect include receiving the relayed at least one transmission from the UE in a PUCCH transmission.

In a thirty-seventh aspect, alone or in combination with the thirty-sixth aspect, the relayed at least one transmission received from the UE includes a payload of a fixed size multiplexed to the PUCCH transmission, the fixed size pre-configured by the base station using the scheduling message.

In a thirty-eighth aspect, alone or in combination with one or more of the twenty-fifth aspect through the thirty-seventh aspect, the relayed at least one transmission received from the UE further includes at least a portion indicating transmissions of the at least one transmission expected from the one or more IoT devices that were not detected by the UE.

In a thirty-ninth aspect, alone or in combination with one or more of the twenty-fifth aspect through the thirty-eighth aspect, the techniques of the twenty-fifth aspect include receiving the relayed at least one transmission from the UE in a PUSCH transmission.

In a fortieth aspect, alone or in combination with the thirty-ninth aspect, the UE relayed at least one transmission includes a payload multiplexed to the PUSCH transmission.

In a forty-first aspect, alone or in combination with one or more of the thirty-ninth aspect through the fortieth aspect, a size of the payload is based on a number of detected transmissions of the at least one transmission.

In a forty-second aspect, alone or in combination with one or more of the twenty-fifth aspect through the forty-first aspect, the relayed at least one transmission further includes a first portion for indicating detected transmissions of the at least one transmission, a second portion for indicating transmissions of the at least one transmission expected from the one or more IoT devices that were not detected by the UE, and/or a third portion for indicating transmissions of the at least one transmission detected from a same IoT device.

In a forty-third aspect, alone or in combination with one or more of the twenty-fifth aspect through the forty-second aspect, the techniques of the twenty-fifth aspect include receiving, from at least one of the one or more IoT devices, configuration information including an indication of whether the at least one of the one or more IoT devices is configured for passive IoT operations, semi-passive IoT operations, or active IoT operations.

In a forty-fourth aspect, alone or in combination with one or more of the twenty-fifth aspect through the forty-third aspect, the configuration information includes an indication that the at least one of the one or more IoT devices is configured for passive IoT operations.

In a forty-fifth aspect, alone or in combination with the forty-fourth aspect, transmissions from the at least one of the one or more IoT devices to the UE include backscatter transmissions.

In a forty-sixth aspect, techniques for supporting mechanisms for configuring an uplink relay for wireless powered IoT operations in a wireless communication system may include an apparatus configured to receive, from a base station, a power signal configured to provide energy for the apparatus to power communication circuitry, to power up the communication circuitry in response to receiving the power signal, to receive, from the base station, an information signal configured to trigger the apparatus to transmit at least one transmission, to transmit the at least one transmission to a UE configured to relay the at least one transmission to the base station. Additionally, the apparatus may perform or operate according to one or more aspects as described below. In some implementations, the apparatus includes a wireless device, such as a IoT device (e.g., wireless powered IoT device).

In a forty-seventh aspect, alone or in combination with one or more of the forty-sixth aspect through the forty-sixth aspect, transmitting the at least one transmission to the UE includes receiving another power signal from the UE, the power signal from the UE configured to provide energy for the apparatus to further power the communication circuitry.

In a forty-eighth aspect, alone or in combination with one or more of the forty-sixth aspect through the forty-seventh aspect, transmitting the at least one transmission to the UE includes harvesting further energy from the power signal from the UE.

In a forty-ninth aspect, alone or in combination with one or more of the forty-sixth aspect through the forty-eighth aspect, transmitting the at least one transmission to the UE includes transmitting the at least one transmission to the UE using a transmit power that includes the energy further energy harvested from the power signal from the UE.

In a fiftieth aspect, alone or in combination with one or more of the forty-sixth aspect through the forty-ninth aspect, the techniques of the forty-sixth aspect include transmitting, to the base station, configuration information including an indication of whether the apparatus is configured for passive IoT operations, semi-passive IoT operations, or active IoT operations.

In a fifty-first aspect, alone or in combination with one or more of the forty-sixth aspect through the fiftieth aspect, the configuration information includes an indication that the apparatus is configured for passive IoT operations.

In a fifty-second aspect, alone or in combination with one or more of the forty-sixth aspect through the fifty-first aspect, transmitting the at least one transmission to the UE includes transmitting a backscatter transmission to the UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A user equipment (UE), comprising:
   at least one processor; and
   a memory coupled to the at least one processor, the memory storing processor-readable code that, when executed by the at least one processor, is configured to perform operations including:
      receiving, from a base station, configuration information for one or more wireless powered internet of things (IoT) devices, the configuration information for the one or more wireless powered IoT devices including information for decoding detected transmissions from the one or more wireless powered IoT devices;
      receiving, from the base station, a scheduling message scheduling the UE to relay at least one transmission from the one or more wireless powered IoT devices to the base station;
      detecting the at least one transmission from the one or more wireless powered IoT devices based on the configuration information for the one or more wireless powered IoT devices; and
      relaying, based on the scheduling message, the at least one transmission to the base station.

2. The UE of claim 1, wherein the configuration information for the one or more wireless powered IoT devices includes one or more of:
   an indication of whether a bandwidth of the one or more wireless powered IoT devices is out of band, inband, or in a band with a guard with respect to a bandwidth of the UE;
   an indication of a frequency associated with the one or more wireless powered IoT devices, wherein the frequency associated with the one or more wireless powered IoT devices is indicated as one or more of: a frequency range, or an absolute frequency point; and
   tag configuration information associated with the one or more wireless powered IoT devices, wherein the tag configuration associated with a wireless powered IoT device indicates one or more of:
      whether the wireless powered IoT device uses on-off keying (OOK) modulation or frequency shift keying (FSK) modulation;
      a number of payload bits in a reflected transmission from the wireless powered IoT device; or
      a response time associated with the wireless powered IoT device; or
   a bulk reading configuration.

3. The UE of claim 2, wherein the configuration information for the one or more wireless powered IoT devices is received by the UE in one or more of:
   a radio resource control (RRC) command transmitted from the base station to the UE; or
   a system information broadcast message broadcast by the base station.

4. The UE of claim 1, wherein the scheduling message from the base station includes one or more of:
   an indication of a reception window for receiving the at least one transmission from the one or more wireless powered IoT devices;
   an indication of a minimum time gap between an end of the scheduling message and a beginning of a reception of a first transmission of the at least one transmission from the one or more wireless powered IoT devices, wherein the UE is configured to forego attempting to detect the at least one transmission from the one or more wireless powered IoT devices during the minimum time gap;

an indication of a number of transmissions in the at least one transmission from the one or more wireless powered IoT devices expected to be received during the reception window;

an indication of wireless powered IoT devices in the one or more wireless powered IoT devices from which a transmission of the at least one transmission is expected during the reception window;

an indication of an uplink resource scheduled for transmitting the at least one transmission detected by the UE from the UE to the base station; or an indication of a minimum time period between an end of a reception of a final transmission of the at least one transmission from the one or more wireless powered IoT devices and a beginning of the uplink resource.

5. The UE of claim 4, wherein the scheduling message is received by the UE in one or more of:
   a radio resource control (RRC) command transmitted from the base station to the UE; or
   a downlink control information (DCI) message from the base station.

6. The UE of claim 1, wherein the operations further include:
   determining that a power timer has expired;
   determining whether all transmissions in the at least one transmission from the one or more wireless powered IoT devices have been detected by the UE before expiration of the power timer;
   transmitting, in response to a determination that all transmissions in the at least one transmission from the one or more wireless powered IoT devices have not been detected by the UE before expiration of the power timer, a power signal configured to provide energy to the one or more wireless powered IoT devices.

7. The UE of claim 6, wherein the power timer is configured to start at one of:
   an end of the scheduling message; or
   reception of a first transmission of the at least one transmission from the one or more wireless powered IoT devices.

8. The UE of claim 1, wherein detecting the at least one transmission from the one or more wireless powered IoT devices based on the configuration information for the one or more wireless powered IoT devices includes:
   receiving the at least one transmission from the one or more wireless powered IoT devices, and
   decoding, based on the configuration information for the one or more wireless powered IoT devices, the at least one transmission from the one or more wireless powered IoT devices.

9. The UE of claim 1, wherein relaying the at least one transmission to the base station includes:
   determining to transmit the relayed at least one transmission to the base station in a physical uplink control channel (PUCCH) transmission;
   determining, based on the scheduling message, a fixed size for the relayed at least one transmission;
   multiplexing the relayed at least one transmission to the PUCCH transmission; and
   transmitting the relayed at least one transmission multiplexed to the PUCCH transmission in an uplink resource scheduled for transmitting the at least one transmission detected by the UE from the UE to the base station.

10. The UE of claim 9, wherein the relayed at least one transmission further includes at least a portion for indicating undetected transmissions of the at least one transmission.

11. The UE of claim 1, wherein relaying the at least one transmission to the base station includes:
    determining to transmit the relayed at least one transmission to the base station in a physical uplink shared channel (PUSCH) transmission;
    determining, based on the scheduling message, a size for the relayed at least one transmission based on a number of detected transmissions of the at least one transmission;
    multiplexing the relayed at least one transmission to the PUSCH transmission; and
    transmitting the relayed at least one transmission multiplexed to the PUSCH transmission in an uplink resource scheduled for transmitting the at least one transmission detected by the UE from the UE to the base station.

12. The UE of claim 11, wherein the relayed at least one transmission further includes one or more of:
    a first portion for indicating detected transmissions of the at least one transmission;
    a second portion for indicating undetected transmissions of the at least one transmission; or
    a third portion for indicating transmissions of the at least one transmission detected from a same wireless powered IoT device.

13. A base station, comprising:
    at least one processor; and
    a memory coupled to the at least one processor, the memory storing processor-readable code that, when executed by the at least one processor, is configured to perform operations including:
       transmitting, to a user equipment (UE), configuration information for one or more internet of things (IoT) devices, the configuration information for the one or more IoT devices including information for decoding transmissions from the one or more IoT devices;
       transmitting, to the one or more IoT devices, a power signal configured to provide energy for the one or more IoT devices to power communication circuitry;
       transmitting, to the one or more IoT devices, an information signal configured to trigger the one or more IoT devices to transmit the transmissions;
       transmitting, to the UE, a scheduling message scheduling the UE to relay at least one transmission of the transmissions from the one or more IoT devices to the base station; and
       receiving, based on the scheduling message, the at least one transmission relayed from the UE.

14. The base station of claim 13, wherein the configuration information for the one or more IoT devices includes one or more of:
    an indication of whether a bandwidth of the one or more IoT devices is out of band, inband, or in a band with a guard with respect to a bandwidth of the UE;
    an indication of a frequency associated with the one or more IoT devices, wherein the frequency associated with the one or more IoT devices is indicated as one or more of: a frequency range, or an absolute frequency point;
    tag configuration information associated with the one or more IoT devices, wherein the tag configuration associated with an IoT device indicates one or more of:

whether the IoT device uses on-off keying (OOK) modulation or frequency shift keying (FSK) modulation;
a number of payload bits in a reflected transmission from the IoT device; or
a response time associated with the IoT device; or
a bulk reading configuration.

15. The base station of claim 14, wherein the configuration information for the one or more IoT devices is transmitted to the UE in one or more of:
a radio resource control (RRC) command transmitted from the base station to the UE; or
a system information broadcast message broadcast by the base station.

16. The base station of claim 13, wherein the scheduling message includes one or more of:
an indication of a reception window for the UE to receive the at least one transmission from the one or more IoT devices;
an indication of a minimum time gap between an end of the scheduling message and a beginning of a reception of a first transmission of the at least one transmission from the one or more IoT device, wherein the UE is configured to forego attempting to detect the at least one transmission from the one or more IoT device during the minimum time gap;
an indication of a number of transmissions in the at least one transmission from the one or more IoT devices expected to be received during the reception window;
an indication of IoT devices in the one or more IoT device from which a transmission of the at least one transmission is expected during the reception window;
an indication of an uplink resource scheduled for relaying the at least one transmission detected by the UE from the UE to the base station; or
an indication of a minimum time period between an end of a reception of a final transmission of the at least one transmission from the one or more IoT device and a beginning of the uplink resource.

17. The base station of claim 16, wherein the scheduling message is transmitted to the UE in one or more of:
a radio resource control (RRC) command transmitted from the base station to the UE; or
a downlink control information (DCI) message.

18. The base station of claim 13, wherein the scheduling message further includes a power timer, wherein the power timer indicates to the UE to transmit, upon expiration of the power timer, another power signal configured to provide energy to the one or more IoT devices when all transmissions in the at least one transmission expected from the one or more IoT devices have not been detected by the UE.

19. The base station of claim 18, wherein the another power timer is configured to start, at the UE, at one of:
an end of the scheduling message; or
reception of a first transmission of the at least one transmission from the one or more IoT devices.

20. The base station of claim 13, wherein the operations further comprise:
receiving the at least one transmission relayed from the UE in a physical uplink control channel (PUCCH) transmission, wherein the at least one transmission relayed from the UE includes a payload of a fixed size multiplexed to the PUCCH transmission, the fixed size pre-configured by the base station using the scheduling message.

21. The base station of claim 20, wherein the at least one transmission relayed from the UE further includes at least a portion indicating transmissions of the at least one transmission expected from the one or more IoT devices that were not detected by the UE.

22. The base station of claim 13, wherein the operations further comprise:
receiving the at least one transmission relayed from the UE in a physical uplink shared channel (PUSCH) transmission, wherein the at least one transmission relayed from the UE includes a payload multiplexed to the PUSCH transmission, wherein a size of the payload is based on a number of detected transmissions of the at least one transmission.

23. The base station of claim 22, wherein the at least one transmission relayed from the UE further includes one or more of:
a first portion for indicating detected transmissions of the at least one transmission;
a second portion for indicating transmissions of the at least one transmission expected from the one or more IoT devices that were not detected by the UE; or
a third portion for indicating transmissions of the at least one transmission detected from a same IoT device.

24. The base station of claim 13, further comprising:
receiving, from at least one of the one or more IoT devices, IoT device configuration information including an indication of whether the at least one of the one or more IoT devices is configured for passive IoT operations, semi-passive IoT operations, or active IoT operations.

25. The base station of claim 24, wherein the IoT device configuration information includes an indication that the at least one of the one or more IoT devices is configured for passive IoT operations, and wherein transmissions from the at least one of the one or more IoT devices to the UE include backscatter transmissions.

26. An apparatus configured for internet of things (IoT) operations, comprising:
communication circuitry including at least one receiver and at least one transmitter, the apparatus configured to perform operations including:
receiving, by the at least one receiver, from a base station, a power signal configured to provide energy for the apparatus to power communication circuitry;
powering up the communication circuitry in response to receiving the power signal;
receiving, by the at least one receiver, from the base station, an information signal configured to trigger the apparatus to transmit at least one transmission; and
transmitting, by the at least one transmitter, the at least one transmission to a user equipment (UE) configured to relay the at least one transmission to the base station.

27. The apparatus of claim 26, wherein transmitting the at least one transmission to the UE includes:
receiving another power signal from the UE, the another power signal from the UE configured to provide energy for the apparatus to further power the communication circuitry;
harvesting further energy from the another power signal from the UE; and
transmitting the at least one transmission to the UE using a transmit power that includes the further energy harvested from the another power signal from the UE.

28. The apparatus of claim 26, further comprising:
transmitting, to the base station, configuration information including an indication of whether the apparatus is configured for passive IoT operations, semi-passive IoT operations, or active IoT operations.

29. The apparatus of claim 28, wherein the configuration information includes an indication that the apparatus is configured for passive IoT operations.

30. The apparatus of claim 29, wherein transmitting the at least one transmission to the UE includes transmitting a backscatter transmission to the UE.

\* \* \* \* \*